United States Patent [19]

Thackeray et al.

[11] Patent Number: 5,240,794
[45] Date of Patent: Aug. 31, 1993

[54] ELECTROCHEMICAL CELL

[75] Inventors: Michael M. Thackeray; Rosalind J. Gummow, both of Pretoria, South Africa

[73] Assignee: Technology Finance Corporation (Proprietary) Limited, Sandton, South Africa

[21] Appl. No.: 811,171

[22] Filed: Dec. 19, 1991

[30] Foreign Application Priority Data

Dec. 20, 1990 [ZA] South Africa ............ 90/10287
Oct. 7, 1991 [ZA] South Africa ............ 91/8005

[51] Int. Cl.$^5$ .................................. H01M 6/16
[52] U.S. Cl. ............................ 429/224; 429/194; 423/599; 423/641
[58] Field of Search .................................. 429/224

[56] References Cited

U.S. PATENT DOCUMENTS

| | | | |
|---|---|---|---|
| 4,529,676 | 7/1985 | Galloway et al. | 429/103 |
| 4,758,484 | 7/1988 | Furukawa et al. | 429/194 |
| 4,828,834 | 5/1989 | Nagaura et al. | 429/224 |
| 4,980,251 | 12/1990 | Thackeray et al. | 429/224 |
| 5,011,752 | 4/1991 | Kordesch et al. | 429/206 |
| 5,030,523 | 7/1991 | Neat et al. | 429/50 |
| 5,153,081 | 10/1992 | Thackeray et al. | 429/194 |

FOREIGN PATENT DOCUMENTS

| | | |
|---|---|---|
| 279235 | 8/1988 | European Pat. Off. |
| 2196785 | 5/1988 | United Kingdom |
| 2221213 | 1/1990 | United Kingdom |
| 2234233 | 1/1990 | United Kingdom |
| 2244701 | 12/1991 | United Kingdom |
| 2245264 | 1/1992 | United Kingdom |

OTHER PUBLICATIONS

Mizushima, Mat. Res. Bull., vol. 15, 783-789 (1980), "A New Cathode for Batteries of High Energy Density".
Plichta, Electrochem. Soc., 136, 1865-1869 (1989), "An Improved Li/Li$_x$CoO$_2$ Rechargeable Cell".
Thackeray, Mat. Res. Symp. Proc., vol. 135, 585-596 (1989), "Developments in Rechargeable MnO$_2$ Electrodes for Lithium Batteries".
Thackeray et al., Mat. Res. Bull., 19, 179-187 (1984), "Electrochemical Extraction of Lithium from LiMn$_2$O$_4$".
Tarascon & Wang, J. Electrochem. Soc., 138, 2859-2864 (1991), "Spinel Phase of LiMn$_2$O$_4$ as a Cathode in Secondary Lithium Cells".
Tarascon & Guyomard, Electrochem. Soc., 138, 2864-2868 (1991), "Li Metal-Free Rechargeable Batteries based on Li$_{1+x}$Mn$_2$O$_4$ Cathodes ... and Carbon Anodes".
Derwent Abstract No. 89367035/50, JP 1274356, Apr. 1988.

*Primary Examiner*—Olik Chaudhuri
*Assistant Examiner*—M. Nuzzolillo
*Attorney, Agent, or Firm*—Dressler, Goldsmith, Shore, Sutker & Milnamow, Ltd.

[57] ABSTRACT

An electrochemical cell precursor and method of making it are provided; and a method of making an electrochemical cell and electrodes therefor. The cell precursor comprises a housing having an anode terminal exposed to its interior. An electrolyte is in the housing for electrochemically coupling the terminal to a cathode in the housing, a cathode precursor being in the housing. The cell precursor is made by loading the electrolyte and cathode precursor into the housing, such that the anode is electrochemically coupled by the electrolyte to the cathode precursor, being electrochemically insulated therefrom. The cell and its electrodes are made by subjecting the cell precursor to a charging potential whereby the cathode precursor acts as a cathode. The cathode precursor comprises at least one compound of lithium, manganese and oxygen, which falls in a defined area of an isothermal slice of the Li-Mn-O phase diagram at 20° C.

27 Claims, 11 Drawing Sheets

ELECTROCHEMICAL CELL

This invention relates broadly to electrochemical cells of the lithium/manganese oxide type. More particularly the invention relates to a precursor of a cell of said type; to a method of making such precursor; to a method of making an electrochemical cell of said type and for making electrodes, for said cell; and to an electrochemical cell of said type and a cathode for said cell.

According to one aspect of the invention there is provided an electrochemical cell precursor which comprises:
- a cell housing;
- an anode terminal exposed to the interior of the cell housing;
- an electrolyte located in the cell housing for electrochemically coupling the anode terminal to a cathode in the housing; and
- a cathode precursor located in the cell housing, the cathode precursor comprising at least one compound of lithium, manganese and oxygen, the cathode precursor being electronically insulated from the anode terminal and being electrochemically coupled to the anode terminal by the electrolyte, and each said compound having a composition which, with reference to an isothermal slice of the Li-Mn-O phase diagram at 20° C., falls within the area of the quadrilateral whose boundary is defined by the $Li_{14}Mn_5O_{12}$-$Li_2Mn_3O_4$ tie line, the $Li_2Mn_3O_4$-$LiMn_3O_4$ tie line, the $LiMn_3O_4$-$Li_4Mn_5O_{12}$ tie line and the $Li_4Mn_5O_{12}$-$Li_{14}Mn_5O_{12}$ tie line.

Preferably said composition falls within the area of the quadrilateral whose boundary is defined by the $Li_{14}Mn_5O_{12}$-$Li_2Mn_3O_4$ tie line, the $Li_2Mn_3O_4$-$LiMn_3O_4$ tie line, the $LiMn_3O_4$-$Li_7Mn_5O_{12}$ tie line and the $Li_7Mn_5O_{12}$-$Li_{14}Mn_5O_{12}$ tie line; and more preferably said composition falls within the area of the quadrilateral whose boundary is defined by the $Li_{14}Mn_5O_{12}$-$Li_2MnO_2$ tie line, the $Li_2MnO_2$-$LiMnO_2$ tie line, the $LiMnO_2$-$Li_7Mn_5O_{12}$ tie line and the $Li_7Mn_5O_{12}$-$Li_{14}Mn_5O_{12}$ tie line. There may be an anode in the cell housing, the anode comprising a suitable substance containing active lithium, for example being selected from the group consisting of lithium metal, lithium/aluminium alloys, lithium/silicon alloys, lithium/carbon compounds and mixtures thereof, the electrolyte being selected from the group consisting of $LiClO_4$, $LiAsF_6$, $LiBF_4$ and mixtures thereof, dissolved in a solvent selected from the group consisting of propylene carbonate, dimethoxy ethane, and mixtures thereof, and the anode being separated from the cathode by a microporous separator of electronically insulating material which is permeable by and impregnated by the electrolyte. Although $LiClO_4$, $LiAsF_6$ and $LiBF_4$ are specifically mentioned above, in principle any suitable salt of lithium dissolved in any suitable organic solvent can be employed for the electrolyte. In such cells the proportions of lithium in the anodes with regard to other constituents of the anodes will typically be what is usually employed in the art.

According to another aspect of the invention there is provided a method of making an electrochemical cell precursor, the method comprising loading into a cell housing having an anode terminal, an electrolyte and a cathode precursor, such that the anode terminal is electrochemically coupled by the electrolyte to the cathode precursor and is electronically insulated from the cathode precursor, the cathode precursor comprising at least one compound of lithium, manganese and oxygen, each said compound having a composition which, with reference to an isothermal slice of the Li-Mn-O phase diagram at 20° C., falls within the area of the quadrilateral whose boundary is defined by the $Li_{14}Mn_5O_{12}$-$Li_2Mn_3O_4$ tie line, the $Li_2Mn_3O_4$-$LiMn_3O_4$ tie line, the $LiMn_3O_4$-$Li_4Mn_5O_{12}$ tie line and the $Li_4Mn_5O_{12}$-$Li_{14}Mn_5O_{12}$ tie line.

The method may include the step of producing the cathode precursor by heating, in a reducing environment provided e.g. by hydrogen or carbon, a substance comprising at least one compound of lithium, manganese and oxygen to a temperature of 80°-800° C. for a period of 3-72 hours, to remove oxygen therefrom; and the heating is preferably in a reducing atmosphere selected from hydrogen and hydrogen/inert gas mixtures, being to a temperature of 250°-400° C. for a period of 12-48 hours, the substance having an average composition which with reference to said isothermal slice of the Li-Mn-O phase diagram at 20° C., falls within the area of the triangle whose boundary is defined by MnO-$MnO_2$ tie line, the $MnO_2$-$Li_2MnO_3$ tie line, and the $Li_2MnO_3$-MnO tie line.

Alternatively, the cathode precursor may be produced by reacting said substance with a mild reducing agent such as lithium iodide at a moderate temperature, e.g. using LiI dissolved in acetronirile at 20°-82° C., such as 75° C.

The method may include the step of making said substance which is subjected to reduction by initially mixing together a lithium-containing component selected from lithium salts, lithium oxides, lithium hydroxides and mixtures thereof, with a manganese-containing component selected from manganese salts, manganese oxides, manganese hydroxides, lithium manganese oxides and mixtures thereof. If desired, the method may include heating the mixture of said components in a non-reducing environment to a temperature of 350°-900° C. for a period of 5-168 hrs. Typically any lithium salt employed will be selected from carbonate and nitrate salts; and any salts of manganese employed will also typically be selected from carbonate and nitrate salts. The environment may be inert, being provided by vacuum or an inert gas such as argon; or it may be oxidizing, being provided by an oxygen or air atmosphere, optionally mixed with inert gas.

The invention extends to an electrochemical cell precursor whenever made by a method as described above.

According to a further aspect of the invention there is provided a method of making an electrochemical cell and a cathode for such cell, the method comprising subjecting an electrochemical cell precursor as described above to a charging potential which causes the cathode precursor to act as a cathode, so that the cathode precursor becomes delithiated and activated by removal of lithium ions therefrom, which ions migrate towards the anode terminal, lithium being deposited to form at least part of an anode for the cell, the charging potential being applied until the average composition of the cathode precursor is at a position on the isothermal slice of the Li-Mn-O phase diagram at 20° C. which is no closer to the $Li_{14}Mn_5O_{12}$-$Li_2Mn_3O_4$ tie line than the $LiMn_3O_4$-$Li_4Mn_5O_{12}$ tie line.

The charging potential is preferably applied until the average composition of the cathode precursor reaches a position on said slice which is further from the $Li_{14}Mn_5O_{12}$-$Li_2Mn_3O_4$ tie line than the $LiMn_3O_4$-$Li_4Mn_5O_{12}$ tie line, the cell then being discharged so that said average composition falls on the $LiMn_3O_4$-$Li_7Mn_5O_{12}$ tie line. In other words, as the charging potential is applied, the average composition of the cathode precursor alters, with a reduction in the proportion of lithium therein, until said average composition preferably falls on the side of the $LiMn_3O_4$-$Li_4Mn_5O_{12}$ tie line remote from the $Li_{14}Mn_5O_{12}Li_2Mn_3O_4$ tie line, and the discharging thereafter increases the proportion of lithium therein until said average composition is on the $LiMn_3O_4$-$Li_7Mn_5O_{12}$ tie line, at which stage the precursor can be regarded as having been converted, for cells of the lithium/manganese oxide type in question, into what can be regarded as a fully discharged cathode.

For the purpose of the present invention the fully discharged state of a cathode of the type in question is when the cathode has a composition which falls on said $LiMn_3O_4$-$Li_7Mn_5O_{12}$ tie line because it is very difficult to insert more lithium into such a structure without any major structural modification thereof, the structure having a stoichiometric rock salt phase with its number of anions being the same as its number of cations.

The cell precursor which is subjected to the charging potential is preferably a cell precursor which has been made by the method described above.

Naturally, the charging potential can be applied until a cell and cathode are obtained which are partially or fully charged, ie until the average composition of the cathode precursor is altered so that it is at a position on said isothermal slice of the Li-Mn-O phase diagram at 20° C. which is on the side of the $LiMn_3O_4$-$Li_4Mn_5O_{12}$ tie line remote from the $Li_{14}Mn_5O_{12}$-$Li_2Mn_3O_4$ tie line, but, for the reasons given hereunder, it is desirable to obtain a cell and cathode which are in their fully discharged states, and which can be charged by a further application of said charging potential until the cathode is fully delithiated and charged.

The invention extends further to an electrochemical cell, whenever made by the method described above; and to an electrode for an electrochemical cell, whenever made by said method.

The cathode precursor may comprise, in addition to said lithium manganese oxide compound having a composition falling within the areas defined by being bounded by the tie lines defined above, a proportion of up to 50 mole %, e.g. 40 mole %, of at least one diluent lithium manganese oxide compound, each diluent compound having a composition falling within the triangle whose boundary is defined by the $LiMn_3O_4$-$MnO_2$ tie line, the $MnO_2$-$Li_4Mn_5O_{12}$ tie line and the $Li_4Mn_5O_{12}$-$Li_2Mn_3O_4$ tie line, which composition can be regarded, for the purpose of cathodes for the cells in question, as an at least partially charged composition, being on the side of the $LiMn_3O_4$-$Li_4Mn_5O_{12}$ tie line remote from the $Li_{14}Mn_5O_{12}$-$Li_2Mn_3O_4$ tie line. Such further partially charged diluent lithium manganese oxide compounds can assist in the electrochemical reaction by which the cathode precursor has its average composition altered by the charging potential until the cell is produced. An example of a cathode precursor in this case can be $Li_2MnO_2$, and the diluent lithium manganese oxide compound used therewith can be $LiMn_2O_4$, the proportions of $Li_2MnO_2$ and $LiMn_2O_4$ being selected so that their average composition is $LiMnO_2$.

While the method of making an electrode can in principle be used for making electrodes for use in one or more cells other than that in which they are made, this method will usually be carried out in the cell for which the electrodes are intended.

When the electrochemical cell precursor has no active lithium anode, it has the advantage that it can be loaded, stored and transported in the absence of any metallic lithium. The cell precursor can, when required for use as a cell, simply be commissioned or activated by means of a charging potential, until the cathode precursor is at or between its fully charged or fully discharged states.

In cells of the type in question difficulties can arise from the lack of availability of all the lithium in the anode during discharging, leading to reduced anode capacity and hence cell capacity. This can be a problem particularly with intercalation anode structures, such as carbonaceous intercalation anodes into which lithium is loaded on the initial charge cycle, but from which lithium cannot be entirely removed on the subsequent discharge cycle. The use of cathode precursors according to the present invention, which contain a surplus of lithium compared with fully discharged cathodes, results, upon full charging of the cell precursor and then of the cell formed thereby, in the deposition/plating out of a surplus of lithium in the anode, which counteracts this lack of lithium availability during cell discharging, and improves operating capacity of the cell.

If the charging potential is maintained until the cell is fully charged, a charged cathode and a charged anode with a surplus of lithium, will be formed. Said cathode and anode can then be used in the cell in which they are formed, or can be removed and loaded into another cell or cells, for use in such other cell or cells.

The invention will now be described, with reference to the following non-limiting Examples, and with reference to the accompanying drawings, in which.

Figure 2:
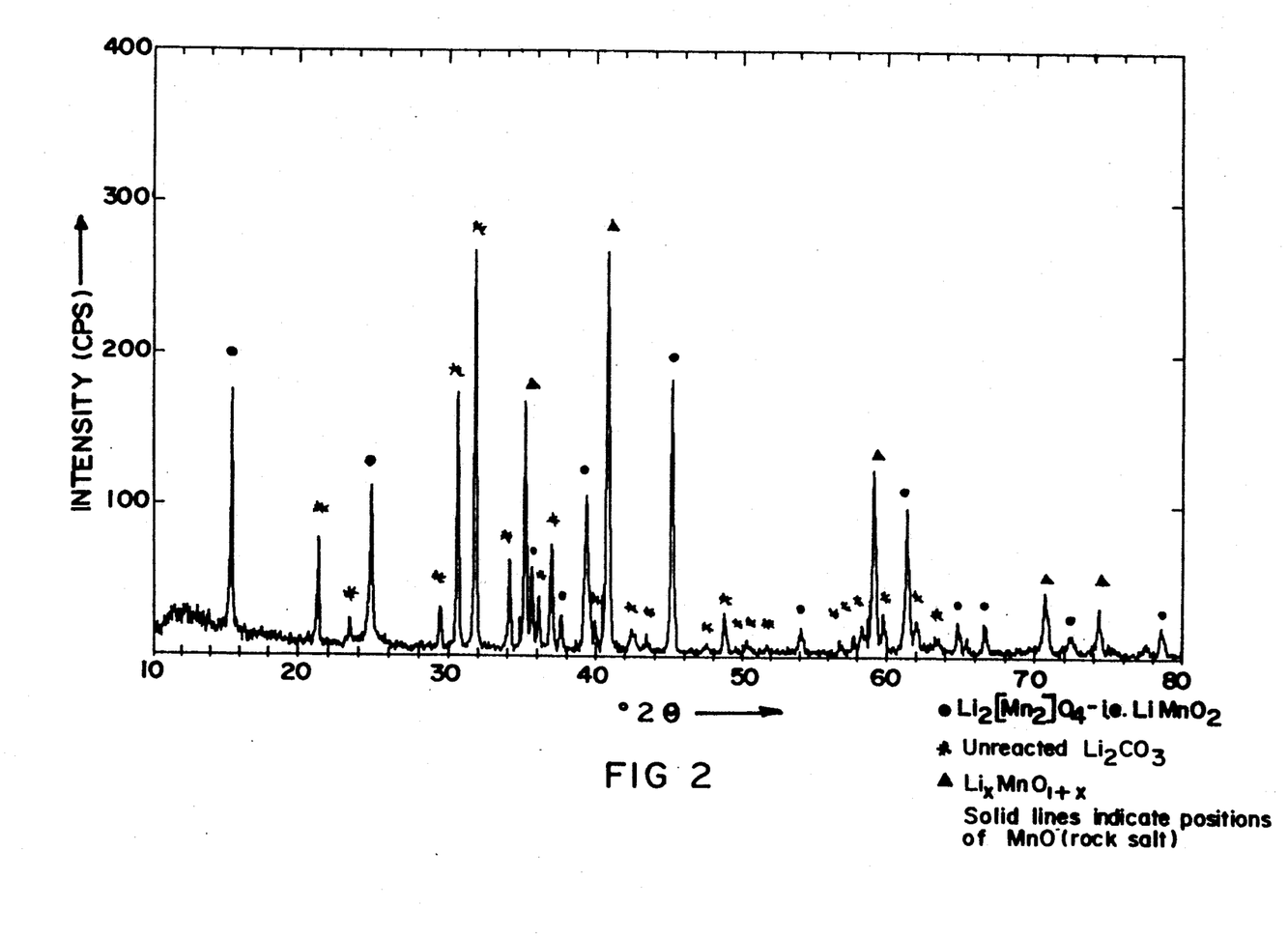
FIG. 2 shows an X-ray diffraction trace of intensity in counts/seconds (CPS) against °$2\theta$, for a cathode precursor material in accordance with the present invention.
Figure 3:
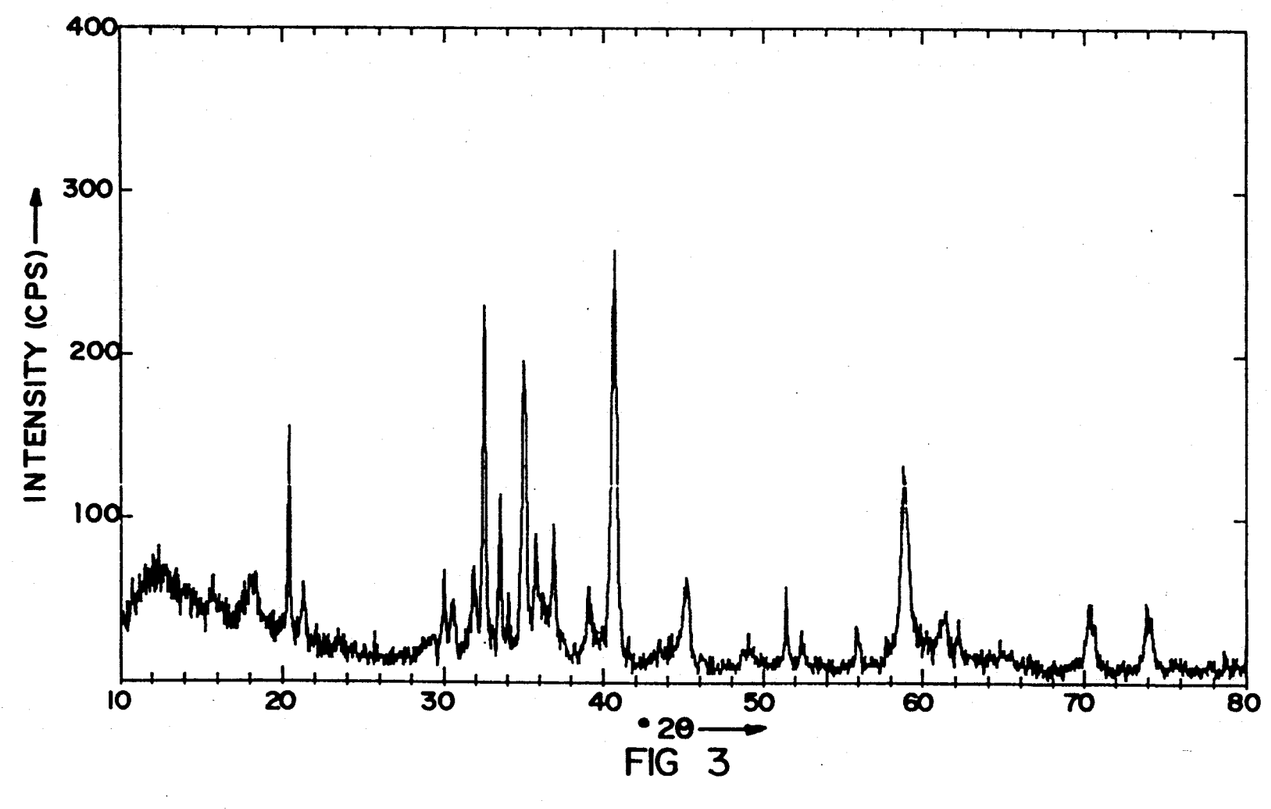
FIG. 3 shows a trace, similar to FIG. 2, for another cathode precursor material in accordance with the invention.
Figure 4:
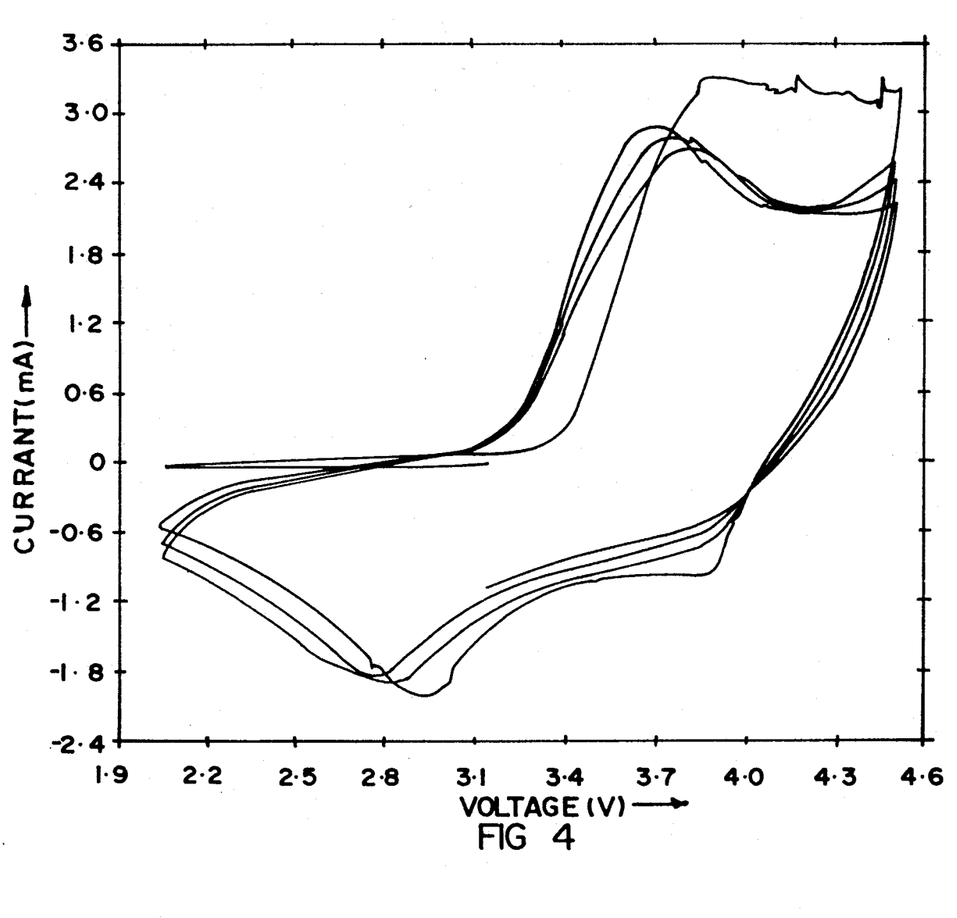
FIG. 4 shows a cyclic voltammogram of an electrochemical cell having a cathode formed from the cathode precursor material whose trace is shown in FIG. 3.
Figure 5:
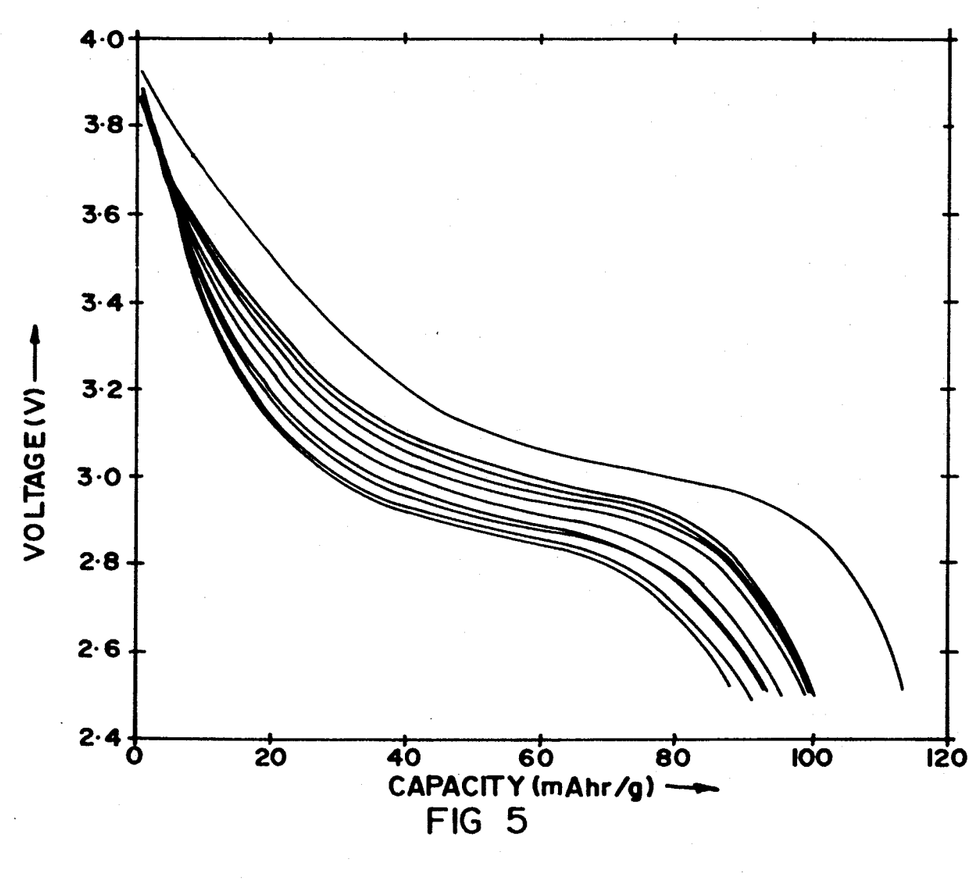
FIG. 5 shows a plot of the discharge curves of the first 10 cycles of the cell whose cyclic voltammogram is shown in FIG. 4.
Figure 6:
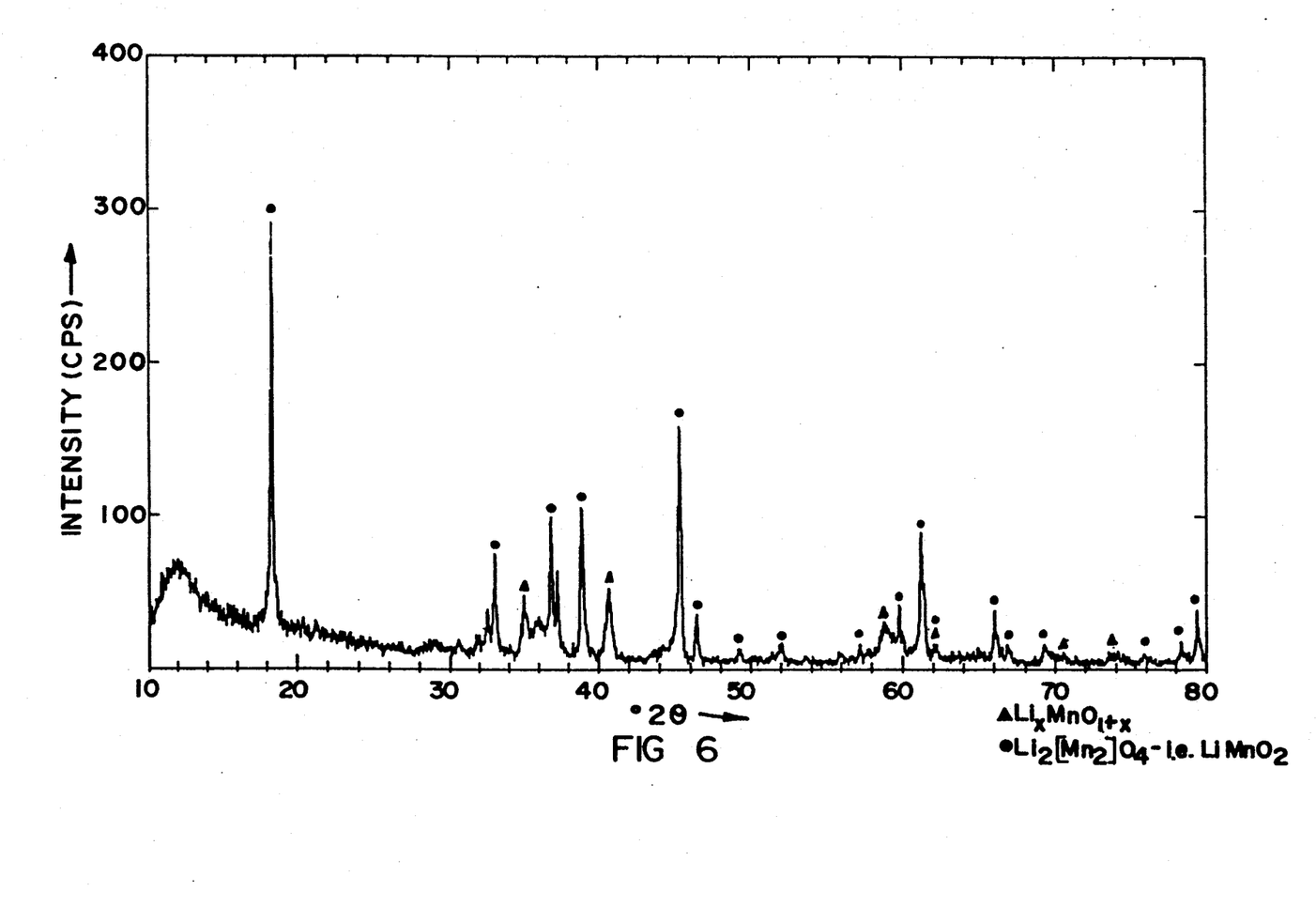
FIG. 6 shows a trace, similar to FIG. 2, for a further cathode precursor material in accordance with the invention.
Figure 7:
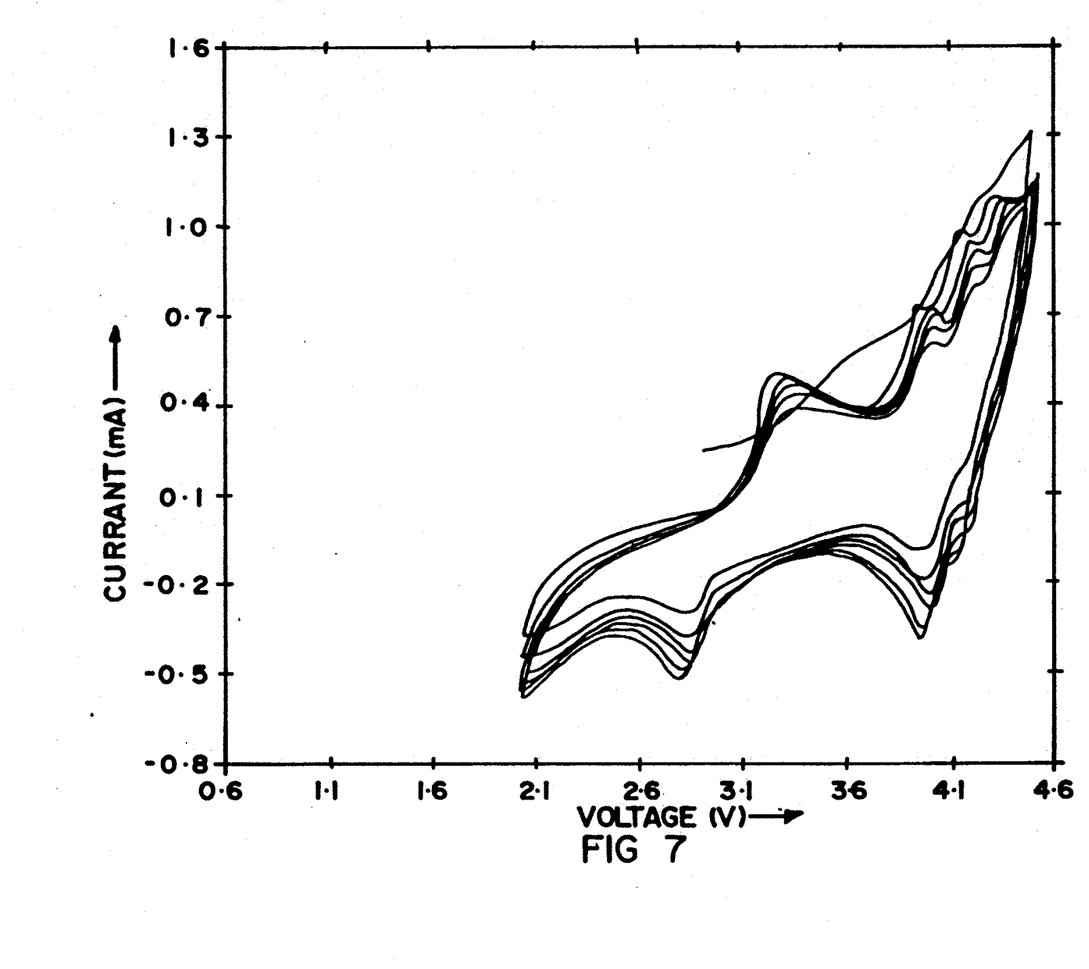
FIG. 7 shows a cyclic voltammogram of an electrochemical cell having a cathode formed from the cathode precursor material whose trace is shown in FIG. 6.
Figure 8:
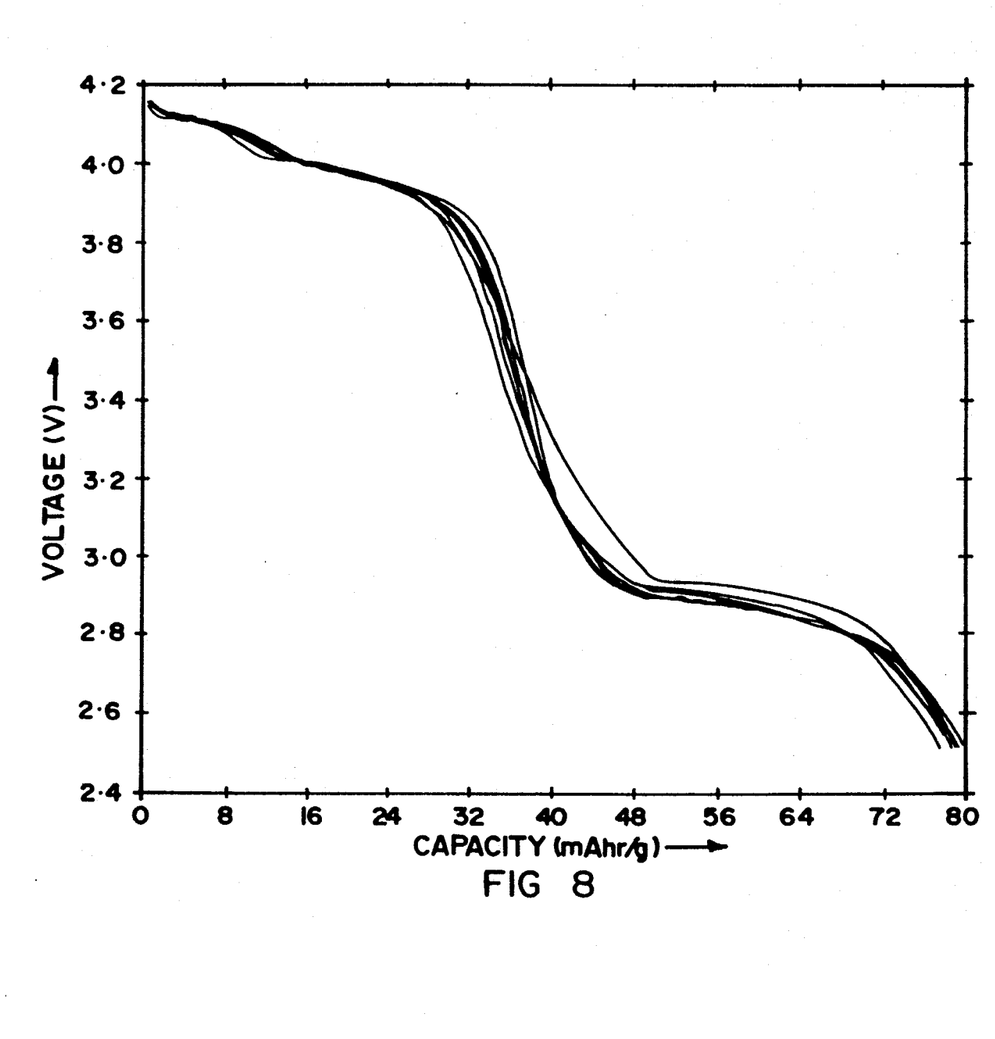
FIG. 8 shows a plot of the discharge curves of the first 7 cycles of the cell whose cyclic voltammogram is shown in FIG. 7.
Figure 9:
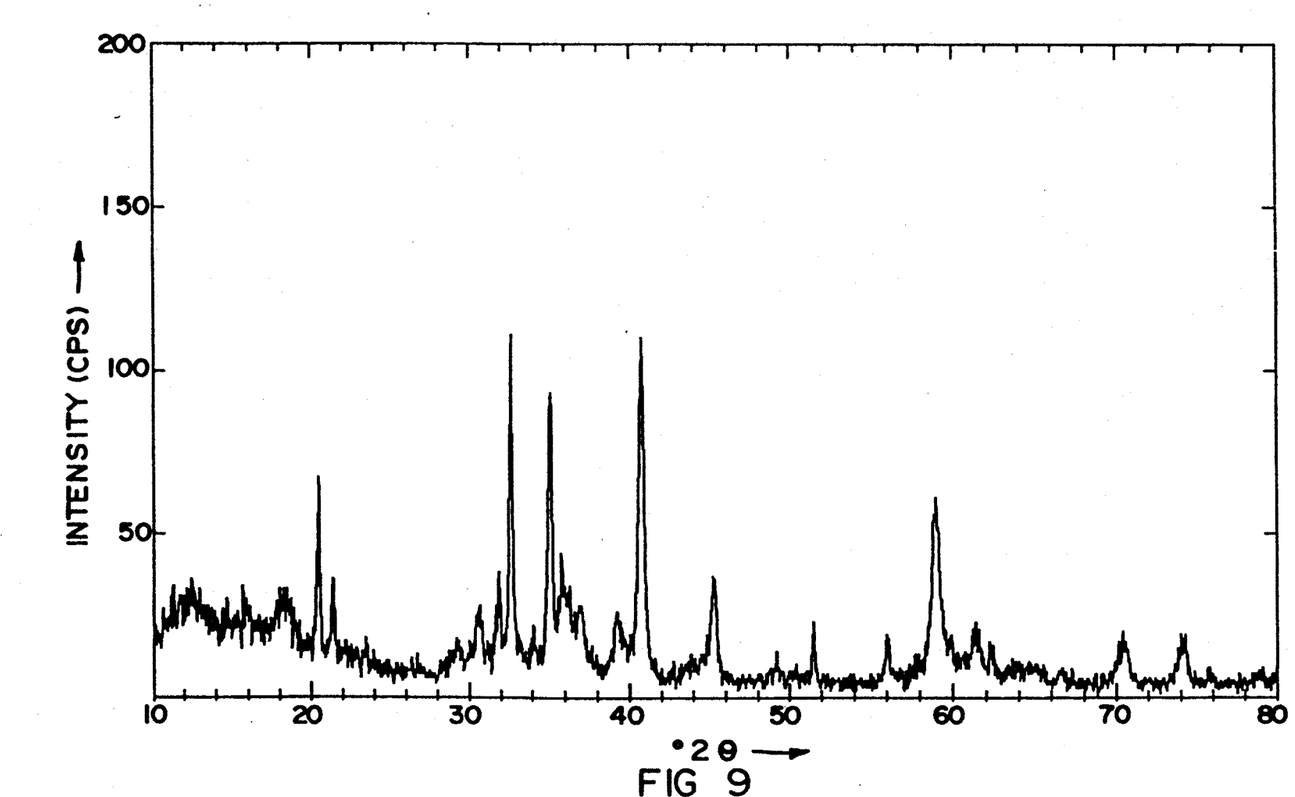
FIG. 9 shows a trace, similar to FIG. 2, of a yet further cathode precursor material in accordance with the present invention.
Figure 10:
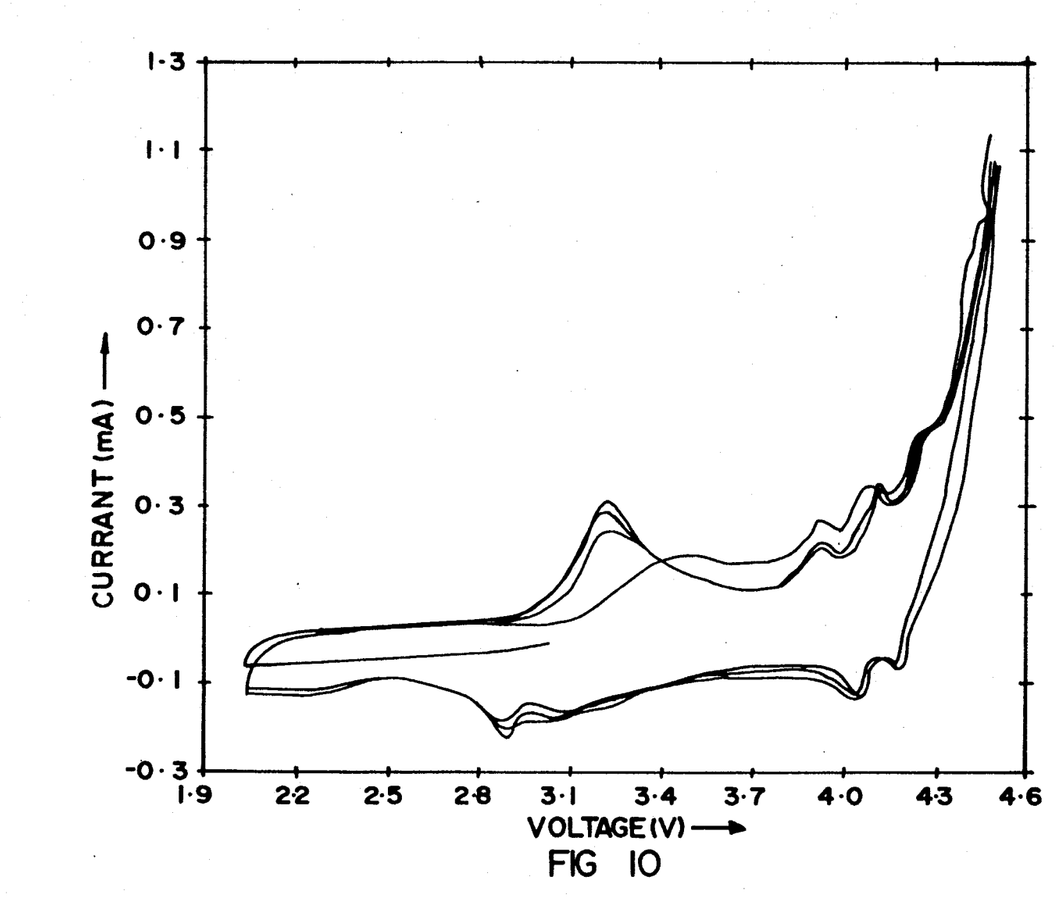
FIG. 10 shows a cyclic voltammogram of an electrochemical cell having a cathode formed from the cathode precursor material whose trace is shown in FIG. 9.

In the traces of FIGS. 2, 3, 6 and 9, $CuK_a$ radiation was employed; in the cyclic voltammograms of FIGS. 4, 7 and 10 a scan rate of 0.5 mV/sec was employed and current (mA) is plotted against voltage (V); and in the plots of FIGS. 5 and 8 voltage (V) is plotted against capacity (mAhr/g).

Figure 1:
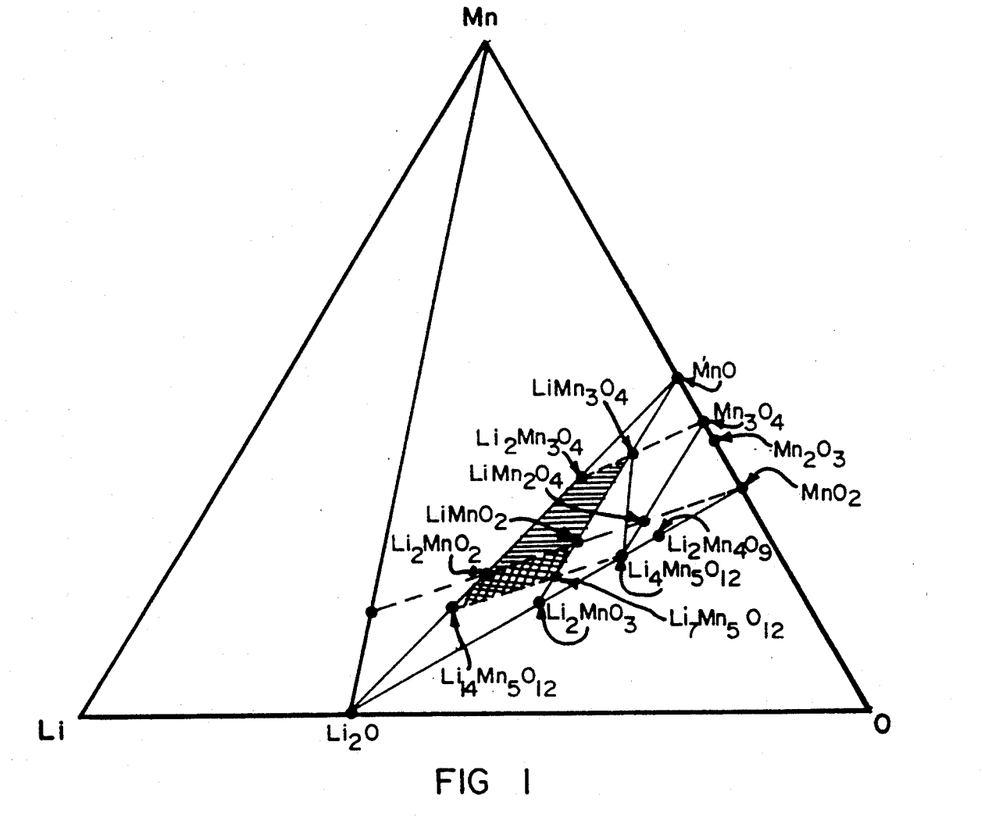
FIG. 1 shows an isothermal slice of the Li-Mn-O phase diagram at 20° C.

FIG. 1 shows said isothermal slice at 20° C. of said phase diagram with regard to whose areas and tie lines the cathode precursors of the present invention have their compositions defined. The positions of various of the compositions referred to hereinabove are shown on the phase diagram, the area within which preferred cathode precursors are to be found being indicated by shaded and cross-hatched zones on the diagram, and the more preferred area being indicated by said cross-hatching.

It is to be noted that compounds in the quadrilateral area bounded by the MnO-$Mn_3O_4$ tie line, the $Mn_3O_4$-$Li_4Mn_5O_{12}$ tie line, the $Li_4Mn_5O_{12}$-$Li_2MnO_3$ tie line and the $Li_2MnO_3$-MnO tie line, can have a defect rock salt structure; and compounds in the triangular area bounded by the $MnO_2$-$Mn_3O_4$ tie line, the $MnO_2$-$Li_4Mn_5O_{12}$ tie line and the $Li_4Mn_5O_{12}$-$Mn_3O_4$ tie line can have a defect spinel structure.

It should further be noted that the MnO-$Li_2MnO_3$ tie line represents stoichiometric rock-salt compounds with a composition of $Li_xMnO_{1+x}$ in which $0<x<2$; and that the cross-hatched area in FIG. 1 has its corners defined by the positions of compounds $Li_xMnO_{1+x}$ on the MnO-$Li_2MnO_3$ tie line whose values of x are 1 ($LiMnO_2$) and 1,4 ($Li_7Mn_5O_{12}$) respectively, and by the positions of the compounds $Li_2MnO_2$ (i.e. $Li_2O.MnO$) and $Li_{14}Mn_5O_{12}$ (i.e. $7Li_2O.5MnO$ or $1,4\ Li_2O.MnO$).

A number of compounds falling within the triangle bounded by the MnO-$Li_2MnO_3$ tie line, the $Li_2MnO_3$-$Li_2O$ tie line and the $Li_2O$-MnO tie line have a cubic-close-packed arrangement of their oxygen anions, which arrangement may be slightly distorted; and certain other compounds in this triangle may be hexagonally close packed. Said cubic close packed compounds include MnO, $LiMnO_2$ and $Li_2MnO_3$ which have stoichiometric rock salt phases; and an example of a compound having a hexagonally close packed arrangement is $Li_2MnO_2$. Further compounds with cubic-close-packed anion arrangements, such as $Mn_3O_4$, $LiMn_2O_4$ and $Li_4Mn_5O_{12}$ have stoichiometric spinel phases; and compounds with defect spinel phases such as $\lambda$-$MnO_2$, $\gamma$-$Mn_2O_3$ and $Li_2Mn_4O_9$ can be discharged into said triangle, while maintaining their phases and said cubic-close-packed oxygen anion arrangement. Stoichiometric spinel phases are characterized by the general spinel formula $A[B_2]X_4$, where A represents cations on an eighth of the $8a$ tetrahedral sites, B represents cations on half of the $16d$ octahedral sites and X represents anions on the $32e$ sites of the prototypical spinel space group Fd3m. It should be noted, however, that the invention is not restricted to cubic-close-packed manganese dioxide phases, but extends also to phases such as $\gamma$-$MnO_2$ and $\beta$-$MnO_2$ which have distorted hexagonally-close-packed oxygen ion arrays.

As an example of a cathode of a cell according to the present invention, which can be considered with reference to FIG. 1, is the compound which in its fully discharged state (i.e. when it is on the MnO-$Li_2MnO_3$ tie line) is represented by $LiMnO_2$ or $Li_2[Mn_2]O_4$ in spinel notation. Using spinel notation, this compound can be charged, in principle, to the theoretically fully charged state $[Mn_2]O_4$ via $Li[Mn_2]O_4$ and discharged to a theoretical limit $2Li_2O+Mn$ as follows: $[Mn_2]O_4 \rightleftharpoons Li[Mn_2]O_4 \rightleftharpoons Li_2[Mn_2]O_4 \rightarrow Li_4Mn_2O_4 \rightarrow 2Li_2O+2Mn$ In non-spinel notation the full discharge sequence can be represented by: $2\lambda\text{-}MnO_2 \rightarrow LiMn_2O_4 \rightarrow 2LiMnO_2 \rightarrow 2Li_2O+2Mn$.

The products $Li_4Mn_2O_4$ and $2Li_2O+2Mn$ therefore represent overdischarged cathode products.

$\lambda$-$MnO_2$ has a defect spinel structure with a cubic-close-packed oxygen lattice; $LiMn_2O_4$ has a stoichiometric spinel structure with a cubic close packed oxygen lattice; $LiMnO_2$ has a rock salt structure with a cubic close packed oxygen lattice; and $Li_2MnO_2$ has a hexagonally close packed oxygen lattice in which $Li^+$ and $Mn^{2+}$ ions occupy tetrahedral and octahedral sites in alternate layers of the structure respectively.

In the following Examples, methods are described for synthesizing cathode precursor materials in accordance with the present invention. It should be noted that these cathode precursors, and the cathodes obtained therefrom, are not necessarily single-phase compositions, and, because of their methods of synthesis often have two-phase or multi-phase compositions. It is however believed that, after activation thereof to form cathodes; many of these precursors have, in the discharged state, a defect rock-salt phase, particularly after several cell cycles.

EXAMPLE 1

An intimate mixture of $Li_2CO_3$ and $MnCO_3$ (obtained e.g. from a solution in water thereof) in a 1:1 mole ratio was heated at 450° C. under an argon atmosphere (negligibly contaminated with oxygen to prevent complete oxidation of the $Mn^{2+}$ cations), to provide said $Li_2MnO_{2+y}$. The X-ray diffraction plot of this product is shown in FIG. 2. FIG. 2 shows the presence of a rock salt $Li_xMnO_{1+x}$ (with $1 \leq x \leq 1,4$), having a significantly smaller cubic lattice parameter of 4,436 Å, compared with that of MnO, which is 4,445 Å. FIG. 2 also shows peaks of unreacted $Li_2CO_3$ and of $LiMnO_2$ having a rock salt structure. (It is to be noted that the Applicant has obtained essentially similar results using $LiNO_3$ and $Mn(NO_3)_2$; and has obtained similar results from mixing in the form of slurries in water).

EXAMPLE 2

A compound $Li_2MnO_3$ having a rock salt structure in which the Mn cations occupy octahedral sites in alternate layers between layers of cubic close-packed-oxygen anions was prepared by heating together LiOH and $Mn(OH)_2$ (other suitable lithium and manganese salts such as the carbonates or oxides can be used instead) at a temperature of 600° C. (other temperatures between 300° C. and 900° C. can be used instead) in air, followed by subjection of the $Li_2MnO_3$ reaction product to a reducing atmosphere of hydrogen diluted by argon at 250° C. until part of the oxygen is removed therefrom, to produce $Li_2MnO_{2+y}$ according to the reaction: $Li_2MnO_3 + (1-y)H_2$ (argon)$\rightarrow Li_2MnO_{2-y} + (1-y)H_2O$.

It is to be noted that $Li_2MnO_{2+y}$ refers to the overall stoichiometric formula of the product, which is not necessarily a single-phase product. Initial experiments have indicated that the $Li_2MnO_{2+y}$ product consists essentially of a $LiMnO_2$ (rock salt-related) phase and a $Li_2MnO_3$ related phase.

EXAMPLE 3

$Li_2CO_3$ and $MnCO_3$ were intimately mixed in proportions selected to provide a Li:Mn atomic ratio of 2:1 to obtain a mixture which was heated to 900° C. in air for 24 hours to form the compound $Li_2MnO_3$. This $Li_2MnO_3$ product was heated at 300° C. under a hydrogen ($H_2$) atmosphere for 24 hours to produce a cathode precursor material.

FIG. 3 shows an X-ray diffraction trace of this precursor material which is a multiphase mixture comprising essentially a $Li_xMnO_{1+x}$ rock-salt phase in which $0<x<1$, a reduced lithium manganese dioxide phase derived from $Li_2MnO_3$ and some lithium hydroxide.

FIG. 4 shows a cyclic voltammogram of this precursor material coupled with a pure lithium electrode in a cell. At a scan rate of 0.5 mV/sec the voltammogram shows no peak during the initial cathodic scan but good reversibility on cycling after an initial activation cycle.

FIG. 5 shows discharge curves of a cell in which a cathode made from this precursor is coupled with a lithium anode, when discharged at about 0.2 mA/cm$^2$ for the first 10 cycles, after charging the cell to an upper cut-off voltage limit of 4 V.

EXAMPLE 4

$LiMn_2O_4$ was prepared by heating an intimate mixture of $Li_2CO_3$ and $MnCO_3$ having a Li:Mn atomic ratio of 1:2 in air at 900° C. for 10 hours. The $LiMn_2O_4$ produced was intimately mixed with $LiOH.H_2O$ to obtain a mixture having an Li:Mn atomic ratio of 1:1 and this mixture was then heated at 300° C. under an $H_2$ atmosphere for 20 hours to produce a cathode precursor material.

FIG. 6 shows an X-ray diffraction trace of this precursor material, which comprises essentially a tetragonal spinel-related phase $Li_2[Mn_2]O_4$, and a rock salt phase $Li_xMnO_{1+x}$ in which $0<x<1$.

FIG. 7 shows a cyclic voltammogram of this precursor material coupled with a pure lithium electrode in a cell. At a scan rate of 0.5 mV/sec of the voltammogram it is apparent that one activation cycle is necessary to activate the precursor material fully as a cathode to obtain, thereafter, good reversibility.

FIG. 8 in turn shows the first 7 discharge curves of a cell in which a cathode made from this precursor is coupled with a pure lithium anode. The discharge rate was about 0.2 mA/cm$^2$, after charging the cell to an upper cut-off voltage limit of 4.2 V.

EXAMPLE 5

Electrolytic manganese dioxide (also known as EMD or $\gamma$-$MnO_2$) and $LiOH.H_2O$ were intimately mixed to obtain a mixture having an Li:Mn atomic ratio of 3:2, and the mixture was heated in air at 300° C. for 20 hours to produce a cathode precursor material.

FIG. 9 shows an X-ray diffraction trace of this precursor material. From a comparison of FIG. 9 with FIG. 3 it appears that this precursor material has a composition similar to that of Example 3.

After additional heating at 350° C. in air for 20 hours, this precursor material was loaded into a cell in which it was coupled with a pure lithium anode. FIG. 10 shows a cyclic voltammogram at a scan rate of 0.5 mV/sec. This voltammogram demonstrates that the precursor material shows little or no electrochemical activity initially, but after an initial activation cycle it thereafter exhibits reproducible rechargeability.

Figure 11:
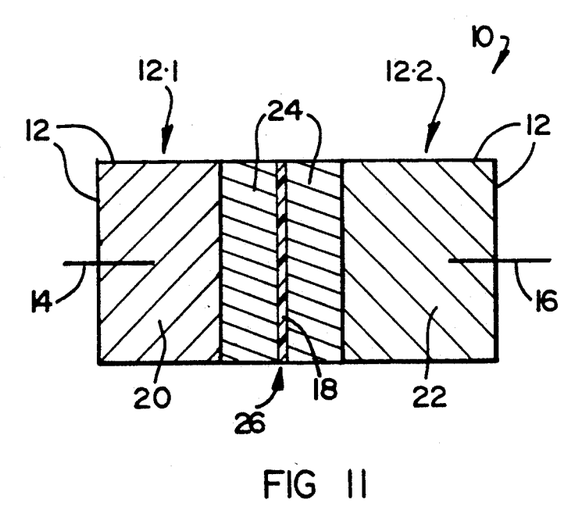
FIG. 11 shows a schematic cross-section of a cell in accordance with the present invention.

In FIG. 11 a schematic sectional side elevation of a test cell in accordance with the present invention, used in the Examples, is generally designated by reference numeral 10. The cell comprises a housing 12 having an anode terminal 14, a cathode terminal 16 and a microporous polypropylene cell separator 18 dividing the housing into a cathode compartment and an anode compartment. An anode 20 is located in the anode compartment in contact with the terminal 14. The cell cathode (or its precursor) is designated 22 and is located in the cathode compartment in contact with the cathode terminal 16; and comprises cathode material in particulate form but compressed to form a mass held together by a polytetrafluoroethylene (PTFE) binder and containing acetylene black in conventional proportions as current collector dispersed therein. The anode and cathode are coupled together by an electrolyte 24 comprising a 1 Molar solution of $LiClO_4$ dissolved in a solvent which is a mixture of propylene carbonate and dimethoxy ethane in a 1:1 ratio by volume.

The part 12.1 of the housing 12 which defines the anode compartment and contains the anode is electronically insulated at 26 from the part 12.2 of the housing which defines the cathode compartment and contains the cathode.

These results have demonstrated that the products of Examples 3, 4 and 5 in particular are electrochemically active and are useful as cathode precursors for primary and secondary lithium/manganese oxide electrochemical cells. It is to be noted, however, that careful control of the process conditions for synthesizing the cathode precursor materials will be necessary, to obtain optimal electrochemical performance.

Apart from the ability of the present invention to provide anodes such as carbonaceous intercalation anodes with a surplus of active lithium to resist anode limiting of cell capacity, it is a particular advantage of the present invention that, using the cathode precursors of the present invention, lithium/manganese cells can be loaded in a discharged or, in particular, an overdischarged state, with no free metallic lithium. Metallic lithium is dangerous and unpleasant to handle, necessitating the inconvenient use of dry rooms, glove boxes, inert atmospheres and the like to avoid reaction thereof with oxygen and/or water. The present invention sidesteps these disadvantages and problems.

Examples 1–5 demonstrate that cathode precursors can be synthesized by solid state reactions from a variety of lithium manganese oxides or manganese oxides, mixed, when desired or when necessary, with diluent lithium manganese oxide compounds and/or lithium sources such as lithium hydroxide.

We claim:

1. An electrochemical cell precursor which comprises:
   a cell housing;
   an anode terminal exposed to the interior of the cell housing;
   an electrolyte located in the cell housing for electrochemically coupling an anode to a cathode in the cell housing; and
   a cathode precursor located in the cell housing, the cathode precursor comprising at least one chemically produced compound of lithium, manganese and oxygen, the cathode precursor being electronically insulated from the anode terminal and being electrochemically coupled to the anode terminal by the electrolyte, and each said chemically produced compound having a composition which, with reference to an isothermal slice of the Li-Mn-O phase diagram at 20° C., falls inside the boundary of the quadrilateral whose boundary is defined by the $Li_{14}Mn_5O_{12}$-$Li_2Mn_3O_4$ tie line, the $Li_2Mn_3O_4$-

LiMn$_3$O$_4$ tie line, the LiMn$_3$O$_4$-Li$_4$Mn$_5$O$_{12}$ tie line and the Li$_4$Mn$_5$O$_{12}$-Li$_{14}$Mn$_5$O$_{12}$ tie line.

2. A cell precursor as claimed in claim 1, in which said composition falls within the area of the quadrilateral whose boundary is defined by the Li$_{14}$Mn$_5$O$_{12}$-Li$_2$Mn$_3$O$_4$ tie line, the Li$_2$Mn$_3$O$_4$-LiMn$_3$O$_4$ tie line, the LiMn$_3$O$_4$-Li$_7$Mn$_5$O$_{12}$ tie line and the Li$_7$Mn$_5$O$_{12}$-Li$_{14}$Mn$_5$O$_{12}$ tie line.

3. A precursor as claimed in claim 2, in which said composition falls within the area of the quadrilateral whose boundary is defined by the Li$_{14}$Mn$_5$O$_{12}$-Li$_2$MnO$_2$ tie line, the Li$_2$MnO$_2$-LiMnO$_2$ tie line, the LiMnO$_2$-Li$_7$Mn$_5$O$_{12}$ tie line and the Li$_7$Mn$_5$O$_{12}$-Li$_{14}$Mn$_5$O$_{12}$ tie line.

4. A precursor as claimed in claim 1, in which there is an anode in the cell housing, the anode being electronically connected to the anode terminal and being selected from the group consisting of lithium metal, lithium/aluminium alloys, lithium/silicon alloys, lithium/carbon compunds and mixtures thereof, the electrolyte being selected from the group consisting of LiClO$_4$, LiAsF$_6$, LiBF$_4$ and mixtures thereof, dissolved in a solvent selected from the group consisting of propylene carbonate, dimethoxy ethane and mixtures thereof, and the anode being separated from the cathode by a microporous separator of electronically insulating material which is permeable by and impregnated by the electrolyte.

5. A method of making an electrochemical cell precursor, which method comprises loading, into a cell housing having an anode terminal, an electrolyte and a cathode precursor, such that the anode terminal is electrochemically coupled by the electrolyte to the cathode precursor, the cathode precursor comprising at least one chemically produced compound of lithium, manganese and oxygen, each said chemically produced compound having a composition which, with reference to an isothermal slice of the Li-Mn-O phase diagram at 20° C., falls inside the boundary of the quadrilateral whose boundary is defined by the Li$_{14}$Mn$_5$O$_{12}$-Li$_2$Mn$_3$O$_4$ tie line, the Li$_2$Mn$_3$O$_4$-LiMn$_3$O$_4$ tie line, the LiMn$_3$O$_4$-Li$_4$Mn$_5$O$_{12}$ tie line and the Li$_4$Mn$_5$O$_{12}$-Li$_{14}$Mn$_5$O$_{12}$ tie line.

6. A method as claimed in claim 5, which includes the step of producing the cathode precursor by heating, in a reducing environment, a substance comprising at least one compound of lithium, manganese and oxygen to a temperature of 80°-800° C. for a period of 3-72 hours, to remove oxygen therefrom.

7. A method as claimed in claim 6, in which the heating is in a reducing atmosphere selected from hydrogen and hydrogen/inert gas mixtures, being to a temperature of 250°-400° C. for a period of 12-48 hours, the substance having an average composition which, with reference to said isothermal slice of the Li-Mn-O phase diagram at 20° C., falls within the area of the triangle whose boundary is defined by the MnO-MnO$_2$ tie line, the MnO$_2$-Li$_2$MnO$_3$ tie line, and the Li$_2$MnO$_3$-MnO tie line.

8. A method as claimed in claim 6, which includes the step of making said substance which is subject to reduction by initially mixing together a lithium-containing component selected from lithium salts, lithium oxides, lithium hydroxides and mixtures thereof, with a manganese-containing compound selected from manganese salts, manganese oxides, manganese hydroxides, lithium manganese oxides and mixtures thereof.

9. An electrochemical cell precursor, produced by the method of claim 5.

10. A method of making an electrochemical cell and electrodes for such cell, the method comprising subjecting an electrochemical cell precursor as claimed in claim 1 to a charging potential which causes the cathode precursor to act as a cathode, so that the cathode precursor becomes delithiated and activated by removal of lithium ions therefrom, which ions migrate towards the anode terminal, lithium being deposited to form at least part of an anode for the cell, the charging potential being applied until the average composition of the cathode precursor is at a position on the isothermal slice of the Li-Mn-O phase diagram at 20° C. which is no closer to the Li$_{14}$Mn$_5$O$_{12}$-Li$_2$Mn$_3$O$_4$ tie line than the LiMn$_3$O$_4$-Li$_4$Mn$_5$O$_{12}$ tie line.

11. A method as claimed in claim 10, in which the charging potential is applied until the average composition of the cathode precursor reaches a position on said slice which is further from the Li$_{14}$Mn$_5$O$_{12}$-Li$_2$-Mn$_3$O$_4$ tie line than the LiMn$_3$O$_4$-Li$_4$Mn$_5$O$_{12}$ tie line, the cell being discharged so that said average composition falls on the LiMn$_3$O$_4$-Li$_7$Mn$_5$O$_{12}$ tie line.

12. A method as claimed in claim 10, in which the cell precursor has been produced by the method of loading into a cell housing having an anode terminal, an electrolyte and a cathode precursor, such that the anode terminal is electrochemically coupled by the electrolyte to the cathode precursor and is electronically insulated from the cathode precursor, the cathode precursor comprising at least one chemically produced compound of lithium, manganese and oxygen, each said chemically produced compound having a composition which, with reference to an isothermal slice of the Li-Mn-O phase diagram at 20° C., falls inside the boundary of the quadrilateral whose boundary is defined by the Li$_{14}$Mn$_5$O$_{12}$-Li$_2$Mn$_3$O$_4$ tie line, the Li$_2$Mn$_3$O$_4$-LiMn$_3$O$_4$ tie line, LiMn$_3$O$_4$-Li$_4$Mn$_5$O$_{12}$ tie line and the Li$_4$Mn$_5$O$_{12}$-Li$_{14}$Mn$_5$O$_{12}$ tie line.

13. An electrochemical cell, produced by the method of claim 10.

14. An electrode for an electrochemical cell, produced by the method of claim 10.

15. A cathodic electrode, produced by the method of claim 10.

16. An electrochemical cell precursor which comprises:
a cell housing;
an electrolyte located in the cell housing for electrochemically coupling an anode to a cathode in the cell housing; and
a chemically produced cathode precursor located in the cell housing, the cathode precursor having an average composition which, with reference to an isothermal slice of the Li-Mn-O phase diagram at 20° C., falls inside the boundary of the quadrilateral whose boundary is defined by the Li$_{14}$Mn$_5$O$_{12}$-Li$_2$Mn$_3$O$_4$ tie line, the Li$_2$Mn$_3$O$_4$-LiMn$_3$O$_4$ tie line, the LiMn$_3$O$_4$-Li$_4$Mn$_5$O$_{12}$ tie line and the Li$_4$Mn$_5$O$_{12}$-Li$_{14}$Mn$_5$O$_{12}$ tie line, at least 50 mole % of the cathode precursor comprising at least one chemically produced electrochemically active compound of lithium, manganese and oxygen which also has a composition which, with reference to said slice, falls inside the boundary of said quadrilateral, the housing, electrolyte and cathode precursor being arranged to permit a charging potential to be applied to the cell precursor to cause lithium from the cathode precursor to form, in the cell housing, at least part of an anode, while converting the cathode precursor to a cathode coupled electrochemically by the electrolyte to the anode.

17. A cell precursor as claimed in claim 16, in which each said composition falls within the area of the quadrilateral whose boundary is defined by the $Li_{14}Mn_5O_{12}$-$Li_2Mn_3O_4$ tie line, the $Li_2Mn_3O_4$-$LiMn_3O_4$ tie line, the $LiMn_3O_4$-$Li_7Mn_5O_{12}$ tie line and the $Li_7Mn_5O_{12}$-$Li_{14}Mn_5O_{12}$ tie line.

18. A cell precursor as claimed in claim 16, in which each said composition falls within the area of the quadrilateral whose boundary is defined by the $Li_{14}Mn_5O_{12}$-$Li_2MnO_2$ tie line, the $Li_2MnO_2$-$LiMnO_2$ tie line, the $LiMnO_2$-$Li_7Mn_5O_{12}$ tie line and the $Li_7Mn_5O_{12}$-$Li_{14}Mn_5O_{12}$ tie line.

19. A cell precursor as claimed in claim 16, in which there is an anode containing electrochemically active lithium in the cell housing, the anode comprising a lithium-containing substance selected from the group consisting of lithium metal, lithium/aluminum alloys, lithium/silicon alloys, lithium/carbon compounds and mixtures thereof, the electrolyte being selected from the group consisting of $LiClO_4$, $LiAsF_6$, $LiBF_4$ and mixtures thereof, dissolved in a solvent selected from the group consisting of polypropylene carbonate, dimethoxy ethane and mixtures thereof, and the anode being separated from the cathode precursor by a microporous separator of electronically insulating material which is permeable by and impregnated by the electrolyte.

20. A method of making an electrochemical cell precursor, which method comprises:
loading, into a cell housing, an electrolyte and a chemically produced cathode precursor, the cathode precursor having an average composition which, with reference to an isothermal slice of the Li-Mn-O phase diagram at 20° C., falls inside the boundary of the quadrilateral whose boundary is defined by the $Li_{14}Mn_5O_{12}$-$Li_2Mn_3O_4$ tie line, the $Li_2Mn_3O_4$-$LiMn_3O_4$ tie line, the $LiMn_3O_4$-$Li_4Mn_5O_{12}$ tie line and the $Li_4Mn_5O_{12}$-$Li_{14}Mn_5O_{12}$ tie line, at least 50 mole % of the cathode precursor comprising at least one chemically produced electrochemically active compound of lithium, manganese and oxygen which also has a composition which, with reference to said slice, falls inside the boundary of said quadrilateral; and
arranging the electrolyte and cathode precursor in the housing to permit a charging potential to be applied to the cell precursor to cause lithium from the cathode precursor to form, in the cell housing, at least part of an anode, while converting the cathode precursor to a cathode coupled electrochemically thereto by the electrolyte.

21. A method as claimed in claim 10, in which the cell precursor which is subjected to the charging potential is a cell precursor which comprises:
a cell housing;
an electrolyte located in the cell housing for electrochemically coupling an anode to a cathode in the cell housing; and
a chemically produced cathode precursor located in the cell housing, the cathode precursor having an average composition which, with reference to an isothermal slice of the Li-Mn-O phase diagram at 20° C., falls inside the boundary of the quadrilateral whose boundary is defined by the $Li_{14}Mn_5O_{12}$-$Li_2Mn_3O_4$ tie line, the $Li_2Mn_3O_4$-$LiMn_3O_4$ tie line, the $LiMn_3O_4$-$Li_4Mn_5O_{12}$ tie line and the $Li_4Mn_5O_{12}$-$Li_{14}Mn_5O_{12}$ tie line, at least 50 mole % of the cathode precursor comprising at least one chemically produced electrochemically active compound of lithium, manganese and oxygen which also has a composition which, with reference to said slice, falls inside the boundary of said quadrilateral, the housing, electrolyte and cathode precursor being arranged to permit a charging potential to be applied to the cell precursor to cause lithium from the cathode precursor to form, in the cell housing, at least part of an anode, while converting the cathode precursor to a cathode coupled electrochemically by the electrolyte to the anode.

22. A cell precursor as claimed in claim 16, in which there is no electrochemically active lithium which is located in the housing and forms part of an anode.

23. A cell precursor as claimed in claim 16, in which the cathode precursor comprises, in addition to said electrochemically active compound, at least one diluent lithium manganese oxide compound, the diluent compound having a composition, which, with reference to said slice, falls within the triangle whose boundary is defined by the $LiMn_3O_4$-$MnO_2$ tie line, the $MnO_2$-$Li_4Mn_5O_{12}$ tie line and the $Li_4Mn_5O_{12}$-$LiMn_3O_4$ tie line.

24. An electrochemical cell precursor which comprises:
a cell housing;
an anode terminal exposed to the interior of the cell housing;
an electrolyte located in the cell housing for electrochemically coupling an anode to a cathode in the cell housing; and
a chemically produced cathode precursor located in the cell housing, the cathode precursor comprising at least one compound of lithium, manganese and oxygen, the cathode precursor being electronically insulated from the anode terminal and being electrochemically coupled to the anode terminal by the electrolyte, and each said chemically produced compound having a composition which, with reference to an isothermal slice of the Li-Mn-O phase diagram at 20° C., falls inside the boundary of the quadrilateral whose boundary is defined by the $Li_2MnO_2$-$Li_2Mn_3O_4$ tie line, the $Li_2Mn_3O_4$-$LiMn_3O_4$ tie line, the $LiMn_3O_4$-$LiMnO_2$ tie line and the $LiMnO_2$-$Li_2MnO_2$ tie line.

25. A method of making an electrochemical cell precursor, which method comprises the steps of:
chemically producing a cathode precursor comprising at least one compound of lithium, manganese and oxygen, each said compound having a composition which, with reference to an isothermal slice of the Li-Mn-O phase diagram at 20° C., falls inside the boundary of the quadrilateral whose boundary is defined by the $Li_{14}Mn_5O_{12}$-$Li_2Mn_3O_4$ tie line, the $Li_2Mn_3O_4$-$LiMn_3O_4$ tie line, the $LiMn_3O_4$-$Li_4Mn_5O_{12}$ tie line and the $Li_4Mn_5O_{12}$-$Li_{14}Mn_5O_{12}$ tie line, by chemically reacting together, outside an electrochemical cell, at least one lithium-containing component selected from lithium salts, lithium oxides, lithium hydroxides and mixtures thereof, and at least one manganese-containing component selected from manganese salts, manganese oxides, manganese hydroxides, lithium manganese oxides and mixtures thereof, to produce said cathode precursor; and before any electrochemically induced change in the composition of the cathode precursor takes place, loading the cathode precursor and an electrolyte into a cell housing having an anode terminal, such that the anode terminal is electrochemically coupled by the electrolyte to the cathode precursor.

26. A method as claimed in claim 25, in which chemically producing the the cathode precursor includes mixing together said components to form a mixture, and heating the mixture.

27. A method as claimed in claim 26, in which the heating of the mixture is in a non-reducing environment, to a temperature of 350°-950° C. for a period of 5-6 hours, to produce a substance comprising at least one compound of lithium, manganese and oxygen, the heating thereafter being of said substance in a reducing environment to a temperature of 80°-800° C. for a period of 3-72 hours, to remove oxygen therefrom.

* * * * *

UNITED STATES PATENT AND TRADEMARK OFFICE
CERTIFICATE OF CORRECTION

PATENT NO. : 5,240,794
DATED : August 31, 1993
INVENTOR(S) : Michael M. Thackeray and Rosalind J. Gummow It is certified that error appears in the above-indentified patent and that said Letters Patent is hereby corrected as shown below:

Column 3, line 50, "$Li_2Mn_3O_4$" should be --$LiMn_3O_4$--.

Column 4, line 37, "seconds" should be --second--.

Column 9, line 21, "compunds" should be --compounds--.

Signed and Sealed this

Twenty-ninth Day of March, 1994

Attest:

BRUCE LEHMAN

*Attesting Officer*     *Commissioner of Patents and Trademarks*